United States Patent [19]

Hakkaku et al.

[11] Patent Number: 5,204,737
[45] Date of Patent: Apr. 20, 1993

[54] COLOR INFORMATION READING APPARATUS FOR READING BINARY DATA

[75] Inventors: Kunio Hakkaku, Kanagawa; Susumu Tomoda, Ayase, both of Japan

[73] Assignee: Fuji Photo Film Co., Ltd., Kanagawa, Japan

[21] Appl. No.: 836,846

[22] Filed: Feb. 19, 1992

[30] Foreign Application Priority Data

Feb. 27, 1991 [JP] Japan .................................. 3-033106

[51] Int. Cl.⁵ .............................................. H04N 1/46
[52] U.S. Cl. ...................................... 358/75; 358/466
[58] Field of Search ................... 358/75, 80, 464, 465, 358/466

[56] References Cited

U.S. PATENT DOCUMENTS

4,577,218 3/1986 Kurata .................................. 358/75
4,907,078 3/1990 Hasebe .................................. 358/75
5,159,471 10/1992 Satou et al. ......................... 358/465

Primary Examiner—Edward L. Coles, Sr.
Assistant Examiner—Kim Yen Vu
Attorney, Agent, or Firm—Sughrue, Mion, Zinn, Macpeak & Seas

[57] ABSTRACT

A color information reading apparatus wherein the apparatus basically comprises an original information reading unit provided with a photoelectric converter element, for scanning an original once with each of first and second light of different colors so as to convert light reflected from the original into electric signals, thereby outputting the converted respective signals in line sequence, an amplifier for amplifying each output from the photoelectric converter element, a bi-level digitizing circuit for representing the output of the amplifier in binary form, a plurality of line memories for storing therein data output from the bi-level digitizing circuit, a threshold level shifting device for changing the threshold level to another for each pixel, a color discriminating circuit for discriminating among colors base on data representing in binary form the signal obtained by scanning the original with the first light and data representing in binary form the signal obtained by scanning the original with the second light, and a color processing circuit for converting the output from the color discriminating circuit into either a white signal or a black signal so as to output the converted signal therefrom when the output of the color discriminating circuit differs from the output of the color discriminating circuit prior to one pixel.

5 Claims, 7 Drawing Sheets

COLOR INFORMATION READING APPARATUS FOR READING BINARY DATA

BACKGROUND OF THE INVENTION

1. Field of the Invention

The present invention relates to a color information reading apparatus suitable for use in facsimile equipment, a color scanner, a copying machine, etc., and more specifically to a color information reading apparatus of a type wherein each signal read from a color original is modulated to produce a modulated output, which is, in turn, represented in binary form, thereby enabling the data represented in binary form to be read.

2. Description of the Related Art

In a conventional color information reading apparatus for reading color information from a two-color original, for example, a photoelectric converter is activated to convert light reflected from a surface of the original irradiated with desired light into analog signals. Then, a signal processing circuit electrically processes the analog signals thus converted so as to sequentially produce multivalued or digitized signals. A preceding digitized signal of the sequentially-produced digitized signals is delayed by a digital delay circuit such as a memory. Thereafter, an arithmetical operation is performed on the preceding digitized signal and a digitized signal electrically processed subsequently to the preceding digitized signal, thereby avoiding invalidating signal components for color discrimination. In addition, the signals, which have been subjected to the arithmetical operation, are represented in binary form, thereby making it possible to avoid wrong color discrimination.

Since the wrong color discrimination can be avoided in this way, it is convenient to use the color information reading apparatus referred to above. However, the color information reading apparatus must provide a digital delay circuit such as a multivalue or digital memory to delay each of the digitized signals, and store the digitized signals therein. Accordingly, the digital delay circuit such as the digital memory becomes complex and its manufacturing cost is high, thereby causing a problem that the color information reading apparatus is complex in structure and its manufacturing cost is rendered high.

SUMMARY OF THE INVENTION

It is a principal object of the present invention to provide a color information reading apparatus which is simple in structure and capable of avoiding wrong color discrimination and preventing a half-tone color from being regarded as colors other than either the white or the black.

It is another object of the present invention to provide a color information reading apparatus comprising original information reading means for scanning an original once with each of first and second light of different colors so as to convert light reflected from the original into electric signals, thereby outputting the converted respective signals in line sequence, bi-level digitizing means for representing each output from the original information reading means in binary form, threshold level shifting means for changing a threshold-level-upon-bi-digitizing to another for each pixel when either a signal obtained by scanning the original with the first light or a signal obtained by scanning the original with the second light is converted into a binary level, color discriminating means for discriminating among colors based on data representing in binary form the signal obtained by scanning the original with the first light and data representing in binary form the signal obtained by scanning the original with the second light, and color processing means for converting the output from the color discriminating means into either a white signal or a black signal so as to output the converted signal therefrom when the output of the color discriminating means differs from the output of the color discriminating means prior to one pixel.

It is a further object of the present invention to provide a color information reading apparatus wherein the threshold level shifting means is used as means for changing the gain of the original information reading means to another.

It is a still further object of the present invention to provide a color information reading apparatus wherein the threshold level shifting means is used as means for changing the threshold level of the bi-level digitizing means to another.

It is a still further object of the present invention to provide a color information reading apparatus wherein the threshold level shifting means is used as means for adding a bias value to the output from the original information reading means.

It is a still further object of the present invention to provide a color information reading apparatus wherein the color processing means includes logical-product operating means for AND-operating the output from the color discriminating means with the output from the color discriminating means prior to one pixel.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

The present invention will hereinafter be described in accordance with preferred embodiments.

Figure 1:
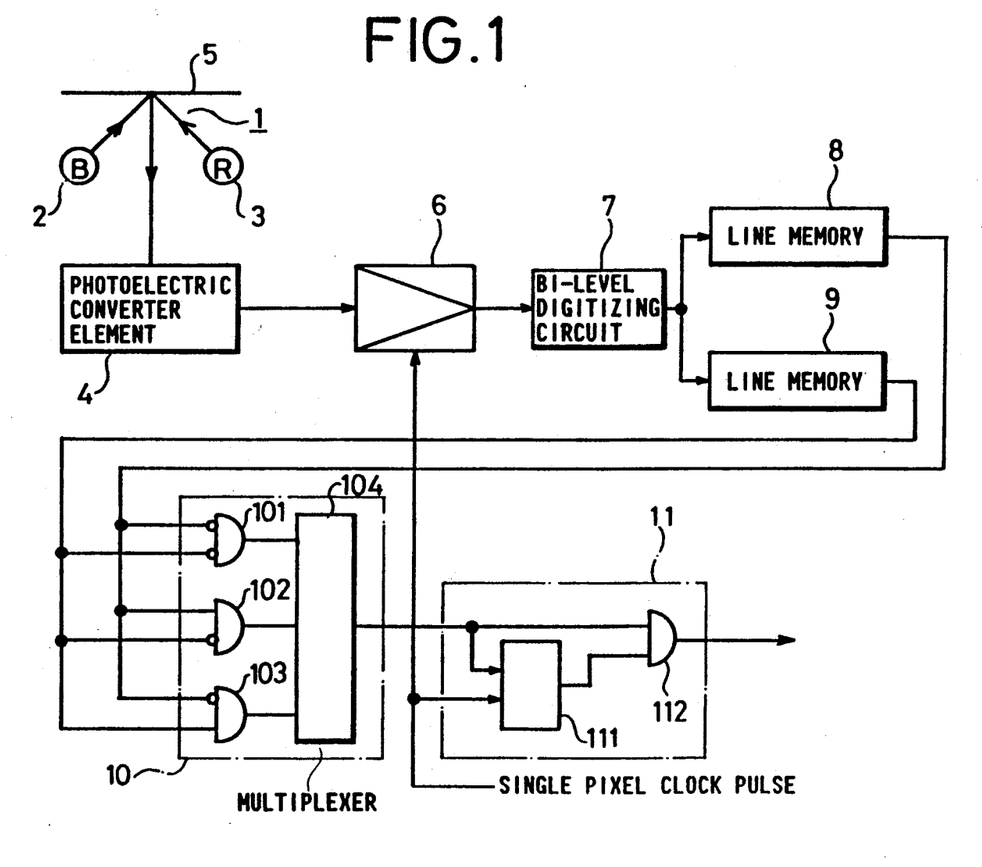
FIG. 1 is a block diagram showing the structure of a first embodiment of the present invention.

FIG. 1 is a block diagram showing the structure of a color information reading apparatus according to a first embodiment of the present invention.

An original information reading unit 1 comprises a light source 2 used to emit blue light, a light source 3 used to emit red light, and a photoelectric converter element 4 such as a CCD (charge-coupled device). An original 5 is scanned once with the light emitted from each of the light sources 2, 3 along the same scanning line without scanning the original 5 in an auxiliary scanning direction or along a substantially-identical scanning line while the original 5 is being scanned in the auxiliary scanning direction. Then, the photoelectric converter element 4 receives light reflected from the original 5 and converts the same into an electric signal, thereby reading information on the original 5 which is illuminated by the light sources 2, 3. Thereafter, the photoelectric converter element 4 outputs thus-read two signals as the information in line sequence. The electric signals output from the photoelectric converter element 4 are supplied to a gain variable amplifier 6, where they are amplified. The gain variable amplifier 6 is constructed in such a manner that the gain of the signal outputted by scanning the original 5 with the light emitted from the light source 2 is constant and the gain of the signal outputted by scanning the original 5 with the light emitted from the light source 3 is switched between high and low levels by a pixel clock pulse synchronized with a charge transfer clock pulse output from the photoelectric converter element 4 and having a period twice that of the charge transfer clock pulse.

The signals output from the gain variable amplifier 6 are supplied to a bi-level digitizing circuit 7, where they are bi-level digitized to produce data represented in binary form. Then, the switching action of the data represented in binary form, which are output from the bi-level digitizing circuit 7, is performed in synchronism with one scan by each light source. In this case, the data, which represents in binary form the signal output by scanning the original 5 once with the light emitted from the light source 2, is supplied to and stored in a line memory 8. After the data represented in binary form has completely been stored in the line memory 8, the original 5 is scanned with the light emitted from the light source 3. The data, which represents in binary form the signal output by scanning the original 5 with the light emitted from the light source 3, is supplied to a line memory 9 and stored therein.

After the data represented in binary form has been stored in the line memory 9, the data stored in the line memories 8, 9 are read in synchronism with each other. The reading of the data from the line memories 8, 9 is carried out three times. Then, the data thus read are supplied to a color discriminating circuit 10, from which data representative of the black, blue and red are respectively output for every scans in bit-serial form. The color discriminating circuit 10 comprises an AND gate 101 for generating an output indicative of the black, an AND gate 102 for generating an output indicative of the blue, an AND gate 103 for generating an output indicative of the red, and a multiplexer 104 which are supplied as inputs with the outputs of the AND gates 101 through 103 and which selects any one of the outputs of the AND gates 101 through 103 each time all the pixels on one scanning line are read so as to output the same therefrom. Then, the output of the color discriminating circuit 10 is supplied to a color processing circuit 11 comprising a one-pixel delay circuit 111 and an AND gate 112 supplied as inputs with the output of the color discriminating circuit 10 and the output of the delay circuit 111. Thereafter, the color processing circuit 11 performs an intermediate tone (i.e., a half-tone) color process with respect to the output of the color discriminating circuit 10.

Figure 2:
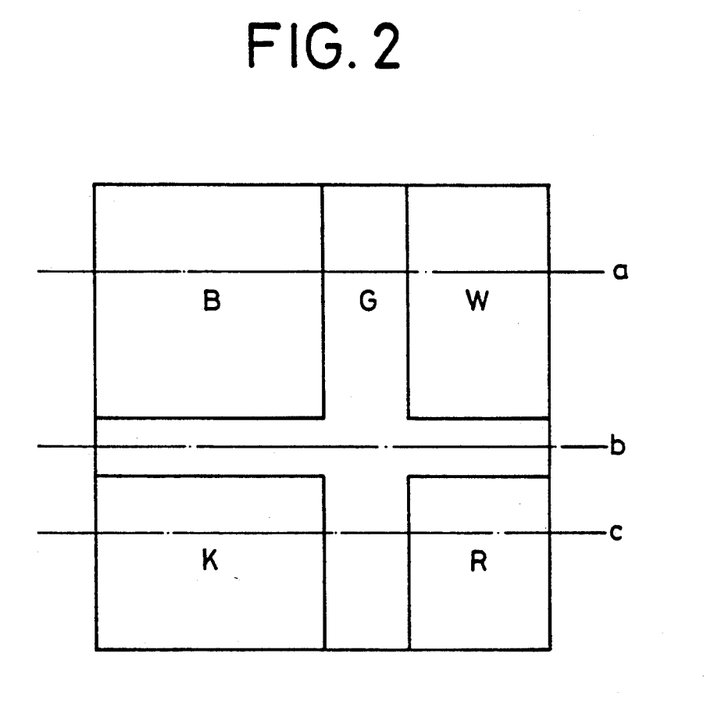
FIG. 2 is a diagram typically showing one example of an original to be read.

The operation of the present embodiment constructed as mentioned above will now be described below with reference to one example descriptive of a case in which an original shown in FIG. 2, for example is read. Symbols B, R, W, K and G shown in FIG. 2 represent the blue, red, white, black and gray respectively. For brief description, let's now assume that the number of pixels in a main scanning direction is taken as 16. In this case, the number of pixels on a scanning line "a" with respect to the blue, gray and white will be 8, 3 and 5 in that order, the number of pixels on a scanning line "b" with respect to the gray will be 16, and the number of pixels on a scanning line "c" for the black, gray and red will be 8, 3 and 5 in that order.

A description will now be made in a case in which the original 5 is scanned once with the light emitted from the light source 2, followed by scanning of the original 5 with the light emitted from the light source 3.

Figures 3A, 3B, 3C:
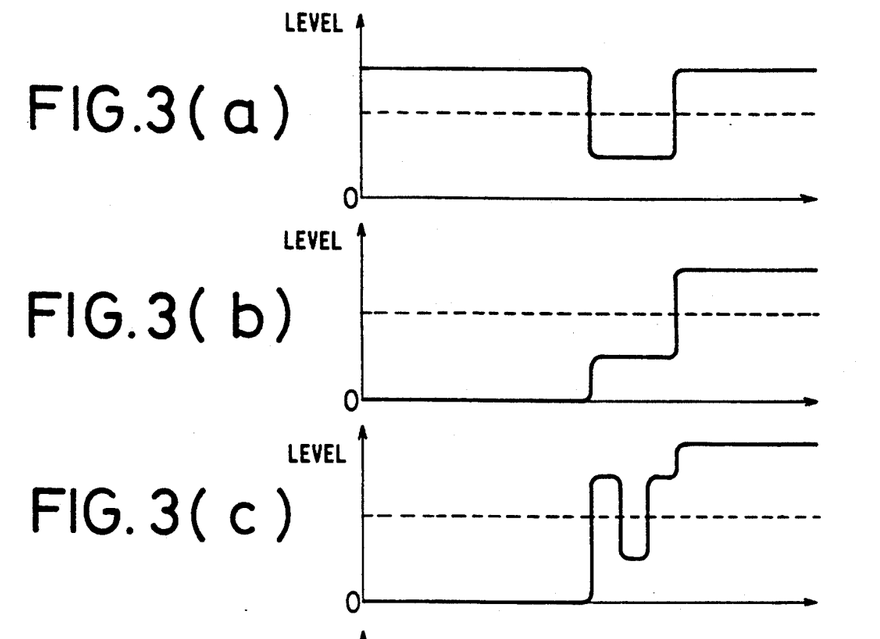
FIGS. 3(a)-3(f) are diagrams showing waveforms of signals output from a photoelectric converter and a gain variable amplifier employed in the first embodiment of the present invention.

When the original 5 is scanned with the light emitted from the light source 2, the light emitted from the light source 2 is reflected from the blue and white sections on the original 5 due to the emission of the blue light from the light source 2. In addition, the light emitted from the light source 2 is not reflected from the red and black sections on the original 5 but slightly reflected from the gray section. Thus, a signal output from the photoelectric converter element 4 when the original 5 is scanned with the light emitted from the light source 2 along the scanning line "a" shown in FIG. 2 is given as illustrated in FIG. 3(a). Then, the output signal is bi-level digitized by the bi-level digitizing circuit 7 to produce data represented in binary form. The data is successively stored in the line memory 8 in synchronism with the charge transfer clock pulse of the photoelectric converter element 4. Now, the stored data can be represented by FF1F (H). The symbol of "H" shows the hexadecimal number. The level of the gray section is slightly lower than the threshold level. The result of representation of the output signal relative to the gray section in binary form shows a "logic 0" state. In addition, broken lines shown in FIGS. 3 and 5 represent threshold levels at the time that the respective output signals are represented in binary form.

After the storing of the data in the line memory 8 has been completed, the original 5 is scanned with the light emitted from the light source 3 along the same scanning line "a". Since the light source 3 emits the red light, the light is reflected from the red and white sections on the original 5. In addition, the light is not reflected from the blue and black sections on the original 5 but slightly reflected from the gray section on the original 5. As a result, a signal output from the photoelectric converter element 4 is given as shown in FIG. 3(b). During a period in which the original 5 is being scanned with the light emitted from the light source 3, the gain variable amplifier 6 is activated to change its gain to either one of high and low levels in response to the pixel clock pulse. The signal output from the photoelectric converter element 4 is amplified by the gain variable amplifier 6 and the output signal thus amplified is represented in binary form by the bi-level digitizing circuit 7. In spite of the switching action of the gain referred to above, the level of the blue section, i.e., the output signal of the gain variable amplifier 6 is zero in level, whereas the level of the white section is greater than the threshold level. The level of the gray section, i.e., the output signal of the gain variable amplifier 6 varies in such a manner as to traverse the threshold level for each pixel due to the changeover of the gain of the gain variable amplifier 6. Accordingly, a signal output from the gain variable amplifier 6 during the period in which the original 5 is scanned with the light emitted from the light source 3 is given as shown in FIG. 3(c). Incidentally, variations in the white section are not shown in FIG. 3(c) because its level is beyond the threshold level. Thus, the resultant data represented in binary form is represented by 00BF(H), and stored in the line memory 9.

After the data represented in binary form has been stored in the line memory 9, the data stored in the line memories 8, 9 are read three times in synchronism with each other. When the data read from the line memories 8, 9 represent (01), they represent the red. Likewise, when the data read from the line memories 8, 9 represent (10), (11), (00), respectively, they show the blue, white and black correspondingly. During the first read period, the multiplexer 104 selects the output of the AND gate 101 and outputs the same therefrom. Accordingly, 0040(H), which represents that a bit representative of the black is up (set) at a 10th pixel, is output during the first read period. During the second read period, the multiplexer 104 selects the output of the AND gate 102 and outputs the same therefrom. Therefore, FF00(H), which represents that a bit indicative of the blue is up (set) till a 8th pixel, is output during the second read period. During the third read period, the multiplexer 104 selects the output of the AND gate 103 and outputs the same therefrom. Accordingly, 00A0(H), which represents that a bit indicative of the red is up (set) at a 9th pixel and a 11th pixel, is output during the third read period. Thus, these outputs from the color discriminating circuit 10 are supplied to the color processing circuit 11.

When the data input to the color processing circuit 11 differs from data prior to one pixel in the color processing circuit 11 supplied with the output of the color discriminating circuit 10, the output representative of each of a "logic 1" and a "logic 0" is input to the AND gate 112, so that the output of the color processing circuit 11 represents a "logic 0". Thus, after a color process has been carried out by the color processing circuit 11, the color processing circuit 11 outputs, during the first read period, 0000(H) representing that all of 16 pixels display colors other than the black. In addition, the color processing circuit 11 outputs, during the second read period, FF00(H) representing that 8 pixels yield the blue and subsequent 8 pixels display colors other than the blue. Furthermore, the color processing circuit 11 outputs, during the third read period, 0000(H) representing that all of 16 pixels display colors other than the red. Thus, when the bit is up (set), the black is recorded on a recording sheet during the first read period. When the bit is up (set), the blue is recorded, during the second read period, on the same line as that on the recording sheet on which the black is recorded during the first read period. When the bit is up (set), the red is recorded, during the third read period, on the same line as that on the recording sheet on which the black is recorded during the first read period. As a result of the above arrangement on the color recording side, the recording of each color on the recording sheet with respect to the scanning line "a" is effected as follows. That is to say, the blue is recorded on the recording sheet by 8 pixels, and the white is then recorded on a blank section of the recording sheet by 8 pixels. Thus, the gray section is regarded as the white. In this way, the gray section is judged as being representative of the white. The problem is, however, that the gray section is regarded as either the red or the blue, although no problem is offered if the gray section is regarded as being either the black or the white.

Even when the original 5 is scanned with the light emitted from each of the light sources 2, 3 along the scanning line "b" in the same manner as described above, the gray section is low in level. Thus, when the original 5 is scanned with the light emitted from the light source 2 therealong, the result of representation of the output signal relative to the gray section in binary form represents a "logic 0" state. When the original 5 is scanned with the light emitted from the light source 3 therealong, the result of representation of the output signal relative to the gray section in binary form produces two alternative states: "logic 1" and "logic 0". Accordingly, data stored in the line memory 8 is represented by 0000(H), whereas data stored in the lime memory 9 is represented by AAAA(H). Thus, the output of 5555(H) produced from the color discriminating circuit 10 during the first read period, the output of 0000(H) produced therefrom during the second read period, and the output of AAAA(H) generated therefrom during the third read period are respectively supplied to the color processing circuit 11. As a result, two alternative forms of output: "logic 1 and logic 0" states are output during the first and third read periods. In addition, the form of output: a "logic 0" state is always output during the second read period. Therefore, after each output from the color discriminating circuit 10 has been electrically processed by the color processing circuit 11, the color processing circuit 11 outputs 0000(H) three times. Consequently, all the outputs of the color processing circuit 11 are electrically processed as the white on the recording side.

Figures 3D, 3E, 3F:
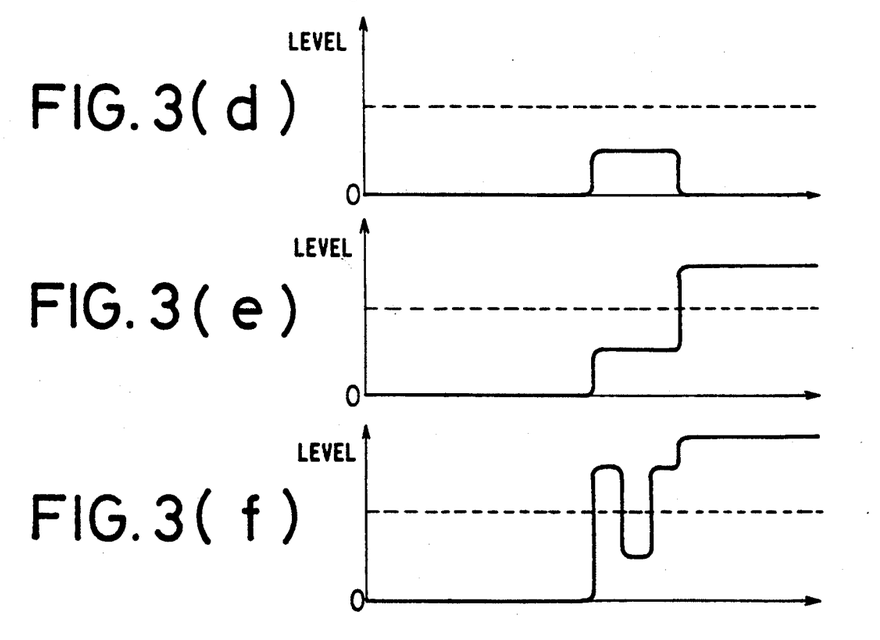
Figure 4:
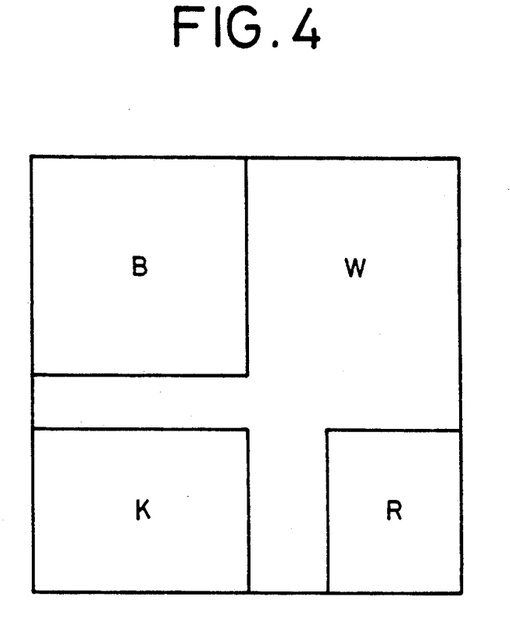
FIG. 4 is a diagram for describing color separation at the time that the original has been read by the first embodiment of the present invention.

When the original 5 is further scanned with the light emitted from each of the light sources 2, 3 along the scanning line "c", a signal output from the gain variable amplifier 6 after the original 5 has been scanned with the light emitted from the light source 2 along the scanning line "c", is given as shown in FIG. 3(d), and data obtained by representing the output signal in binary form in the bi-level digitizing circuit 7 can be represented by 0000(H). In addition, a signal output from the photoelectric converter element 4 after scanned with the light emitted from the light source 3 therealong, is given as shown in FIG. 3(e). Further, a signal output from the gain variable amplifier 6 is given as shown in FIG. 3(f), and data obtained by representing the output signal in binary form in the bi-level digitizing circuit 7 can be represented by 00BF(H). Accordingly, the output of FF40(H) produced from the color discriminating circuit 10 during the first read period, the output of 0000(H) produced therefrom during the second read period, and the output of 00BF(H) generated therefrom during the third read period are respectively supplied to the color processing circuit 11. Thus, after each output from the color discriminating circuit 10 has been electrically processed by the color processing circuit 11, the color processing circuit 11 outputs, during the first read period, FF00(H) representing that 8 pixels display the black and subsequent 8 pixels display colors other than the black. In addition, the color processing circuit 11 outputs, during the second read period, 0000(H) representing that 16 pixels yield colors other than the blue. Furthermore, the color processing circuit 11 outputs, during the third read period, 001F(H) representing that 11 pixels display colors other than the red and subsequent 5 pixels display the red. Accordingly, the gray section is electrically processed as the white. Therefore, the color separation at the time that the original shown in FIG. 2 has been read is given as shown in FIG. 4.

Figure 5A:
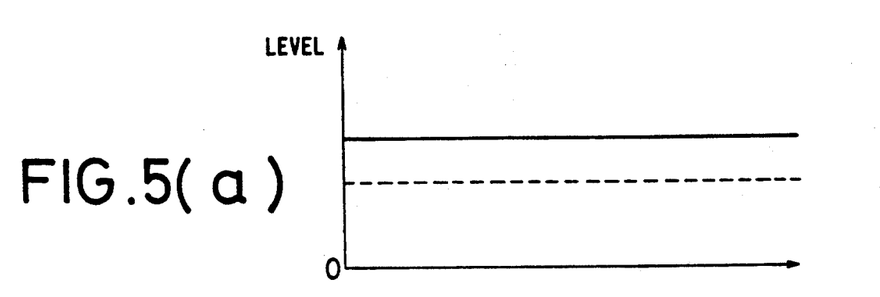
FIGS. 5(a)-5(d) are diagrams illustrating waveforms of signals output from the gain variable amplifier employed in the first embodiment of the present invention when a scanning sequence is changed.
Figure 5B:
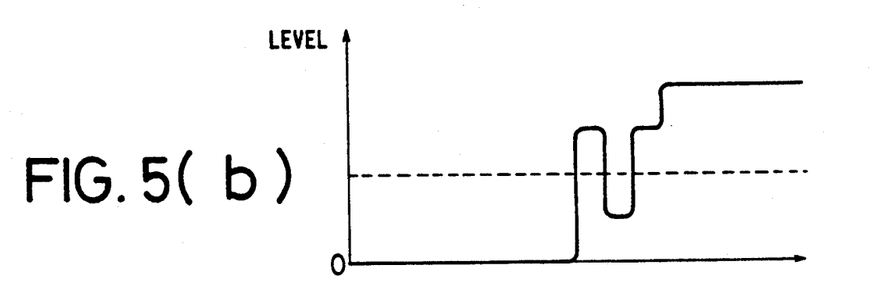

The above embodiment has described a case in which the gray section is low in level and the result of the representation of the output signal relative to the gray section in binary form is regarded as the logical "0" state. If the result is regarded as the logical "1" state, then a signal output from the photoelectric converter element 4 after the original is scanned with the light emitted from the light source 2 along the scanning line "a" is given as shown in FIG. 5(a). In addition, data represented in binary form, which is stored in the line memory 8, can be represented by FFFF(H). A signal input to the bi-level digitizing circuit 7 after the original is scanned with the light emitted from the light source 3 along the scanning line "a", is given as illustrated in FIG. 5(b), and data stored in the line memory 9 can be represented by 00BF(H). Accordingly, the color discriminating circuit 10 outputs, during the first read period, 0000(H) representing that 16 pixels display colors other than the black. Further, the color discriminating circuit 10 outputs, during the second read period, FF40(H) which represent that a bit indicative of the blue is up (set) till a 8th pixel. Likewise, the color discriminating circuit 10 outputs, during the third read period, 0000(H) representing that 16 pixels display colors other than the red. These outputs are all supplied to the color processing circuit 11.

After each output from the color discriminating circuit 10 has been electrically processed by the color processing circuit 11, the color processing circuit 11 outputs, during the first read period, 0000(H) representing that all the pixels display colors other than the black. Further, the color processing circuit 11 outputs, during the second read period, FF00(H) representing that 8 pixels display the blue and subsequent 8 pixels display colors other than the blue. Furthermore, the color processing circuit 11 outputs, during the third read period, 0000(H) representing that 16 pixels display colors other than the red. As a result, the recording of each color on a recording sheet with respect to the scanning line "a" is made as follows. That is to say, the blue is recorded on the recording sheet by 8 pixels and the white is then recorded on a blank section of the recording sheet by 8 pixels.

When the original 5 is scanned with the light emitted from each of the light sources 2, 3 along the scanning line "b" in the same manner as described above, the gray section is high in level. Thus, when the original 5 is scanned with the light emitted from the light source 2 therealong, the result of representation of the output signal relative to the gray section in binary form represents a "logic 1" state. When the original 5 is scanned with the light emitted from the light source 3 therealong, the result of representation of the output signal relative to the gray section in binary form represents two alternative states: "logic 1" and "logic 0". Accordingly, data stored in the line memory 8 is represented by FFFF(H), whereas data stored in the lime memory 9 is represented by AAAA(H). Thus, the output of 0000(H) produced from the color discriminating circuit 10 during the first read period, the output of AAAA(H) produced therefrom during the second read period, and the output of 0000(H) generated therefrom during the third read period are respectively supplied to the color processing circuit 11. As a result, 0000(H) is output during the first and third read periods. That is, the color processing circuit 11 performs a color process in such a manner that all of 16 pixels display colors other than the black and all of 16 pixels display colors other than the red. Since two alternative forms of output: "logic 1 and logic 0" states are output during the second read period, the color processing circuit 11 performs a color process such that all of 16 pixels display colors other than the blue. As a result, all of 16 pixels display the white.

Figure 5C:
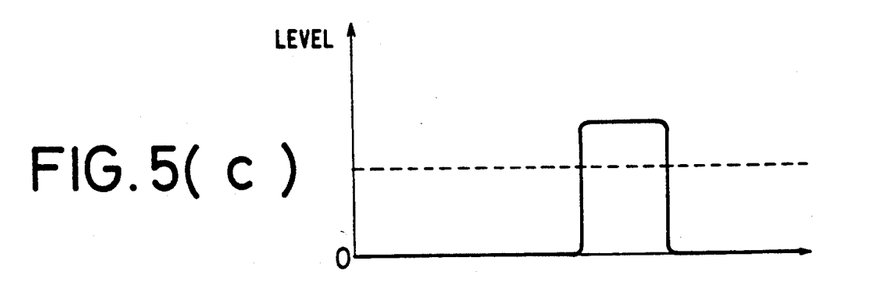
Figure 5D:
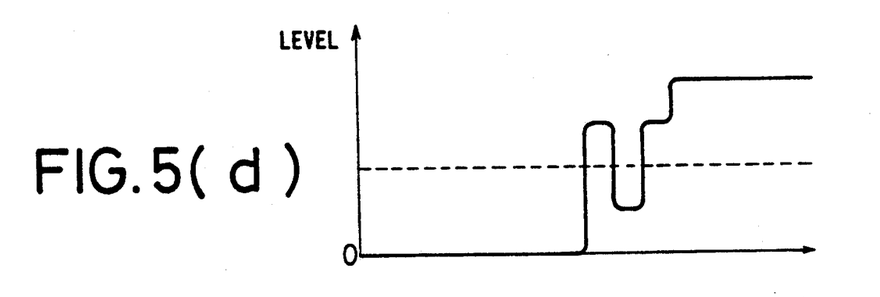
Figure 6:
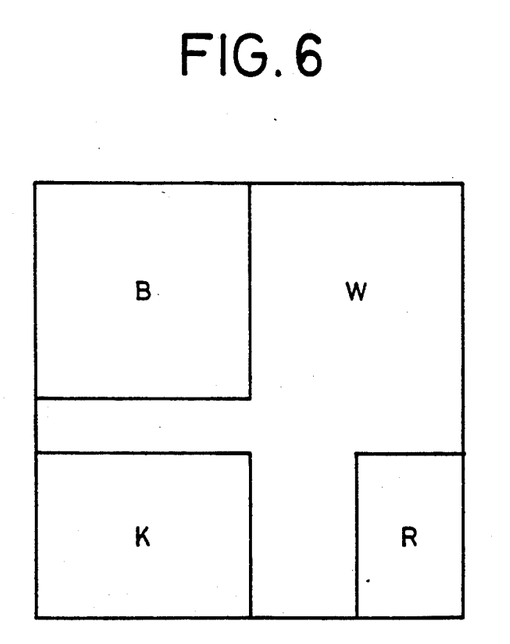
FIG. 6 is a diagram for describing color separation at the time that the original has been read upon change in a scanning sequence in the first embodiment of the present invention.

When the original 5 is further scanned with the light emitted from each of the light sources 2, 3 along the scanning line "c", a signal output from the gain variable amplifier 6 after the original has been scanned with the light emitted from the light source 2 along the scanning line "c", is given as shown in FIG. 5(c), and data obtained by representing the output signal in binary form in the bi-level digitizing circuit 7 can be represented by 00E0(H). In addition, a signal output from the gain variable amplifier 6 after scanned with the light emitted from the light source 3 therealong, is given as shown in FIG. 5(d), and data obtained by representing the output signal in binary form in the bi-level digitizing circuit 7 can be represented by 00BF(H). Accordingly, the output of FF00(H) from the color discriminating circuit 10 during the first read period, the output of 0040(H) therefrom during the second read period, and the output of 001F(H) therefrom during the third read period are respectively supplied to the color processing circuit 11. Thus, after a color process of each output has been carried out by the color processing circuit 11, the color processing circuit 11 outputs, during the first read period, FF00(H) representing that 8 pixels display the black and subsequent 8 pixels display colors other than the black. Further, the color processing circuit 11 outputs, during the second read period, 0000(H) representing that 16 pixels display colors other than the blue. Furthermore, the color processing circuit 11 outputs, during the third read period, 000F(H) representing that 12 pixels display colors other than the red and subsequent 4 pixels display the red. Accordingly, the gray section is electrically processed as the white. Thus, the color separation at the time the original shown in FIG. 2 has been read can be effected as shown in FIG. 6.

Incidentally, the present embodiment can similarly be applied even to a case in which the original is first scanned once with the light emitted from the light source 3 and then scanned once with the light emitted from the light source 2. At this case, when it is desired to make determination such that when the data read from the line memories 8 and 9 represent (10), (01), (11) and (00), respectively, they are regarded as being representative of the red, blue, white and black respectively, it is only necessary to make a change in the position where the AND gates 102 and 103 as inverters are inserted into the color discriminating circuit 10.

The output of the AND gate 101, which supplies via the multiplexer 104 to the color processing circuit 11, may bypass the color processing circuit 11 so as to be output to the next stage.

A description will now be made of a color information reading apparatus according to a second embodiment of the present invention.

Figure 7:
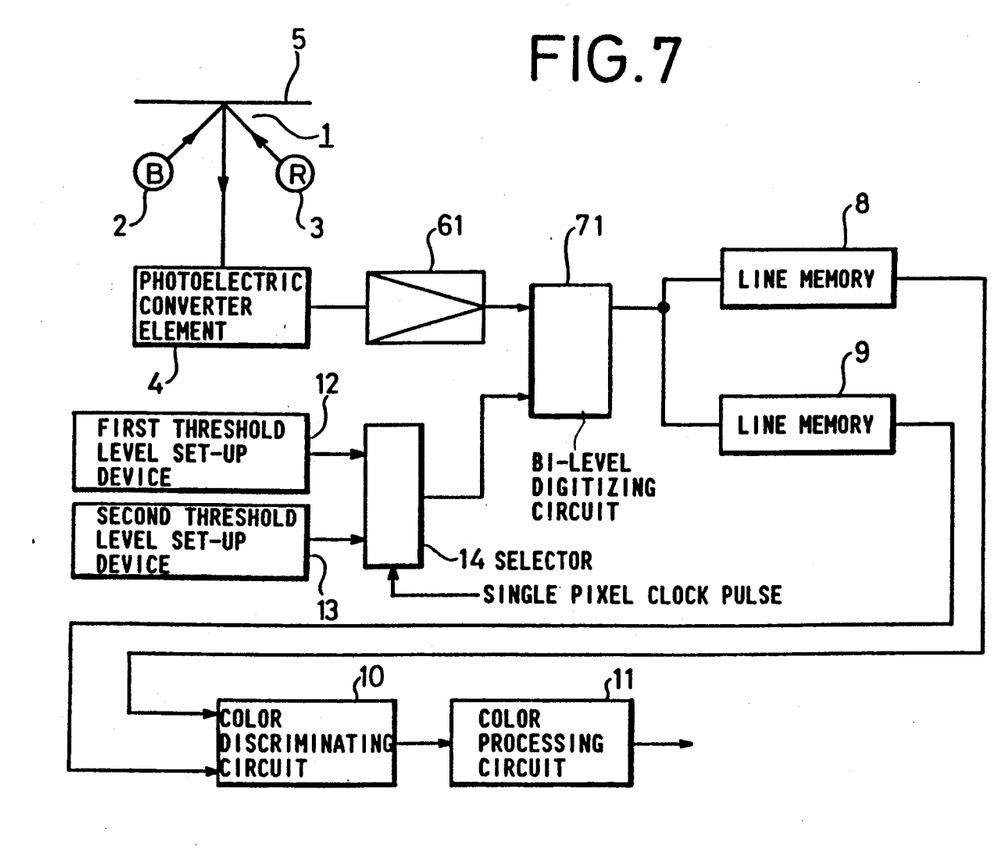
FIG. 7 is a block diagram showing the structure of a second embodiment of the present invention.

FIG. 7 is a block diagram showing the structure of the color information reading apparatus according to the second embodiment of the present invention.

In addition to the elements of structure employed in the first embodiment, the second embodiment is additionally provided with first and second threshold level set-up devices 12, 13, a gain-stable type amplifier 61 used as an alternative to the gain variable amplifier 6 employed in the first embodiment, a bi-level digitizing circuit 71 which is used as an alternative to the bi-level digitizing circuit 7 employed in the first embodiment and whose threshold level is set up from an external device, and a selector 14 for supplying a threshold level set up by the second threshold level set-up device 13 to the bi-level digitizing circuit 71 when an original 5 is being scanned with light emitted from a light source 2 and for selecting either one of a threshold level set up by the first threshold level set-up device 12 and a threshold level set up by the second threshold level set-up device 13 in response to a single pixel clock pulse when the original 5 is being scanned with light emitted from a light source 3 so as to supply the selected threshold level to the bi-level digitizing circuit 71. Each signal output from a photoelectric converter element 4 is amplified by the amplifier 61, and the amplified signal is then represented in binary form by the bi-level digitizing circuit 71.

In the second embodiment constructed as described above, the threshold level of the first threshold level set-up device 12 is set to be lower than that of the second threshold level set-up device 13. In addition, either one of the threshold level of the first threshold level set-up device 12 and the threshold level of the second threshold level set-up device 13 is selected by the selector 14 for each pixel only when the original 5 is being scanned with the light emitted from the light source 3. Accordingly, the second embodiment has a functional structure equivalent to that of such a type that when the threshold level of the first threshold level set-up device 12 is selected, the gain of the gain variable amplifier 6 is increased, whereas when the threshold level of the second threshold level set-up device 13 is selected, the gain of the gain variable amplifier 6 is reduced. Therefore, the operation of the second embodiment is also identical to that of the first embodiment.

A description will now be made of a color information reading apparatus according to a third embodiment of the present invention.

Figure 8:
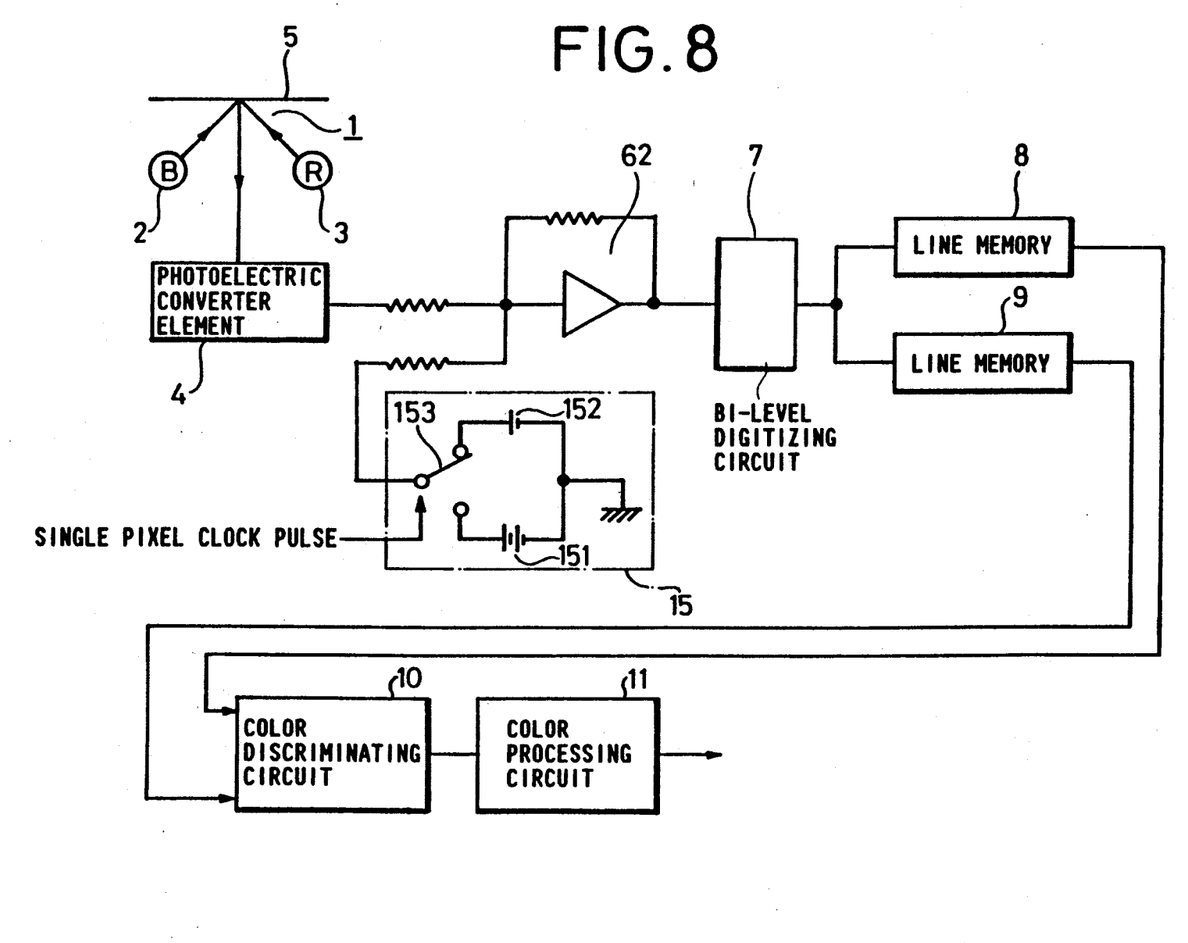
FIG. 8 is a block diagram illustrating the structure of a third embodiment of the present invention.

FIG. 8 is a block diagram showing the structure of the color information reading apparatus according to the third embodiment of the present invention.

In addition to the element of structure employed in the first embodiment, the third embodiment is additionally provided with an offset power circuit 15 comprising two offset voltage sources 151, 152 whose voltages differ from each other and a changeover switch 153 for selecting the output voltage of the offset voltage source 152 when an original 5 is being scanned with light emitted from a light source 2 and for selecting either one of the output voltage of the offset voltage source 151 and the output voltage of the offset voltage source 152 in response to a single pixel clock pulse when the original 5 is being scanned with light emitted from a light source 3, and an adder 62 used as an alternative to the gain variable amplifier 6, for adding together the output of a photoelectric converter element 4 and the output of the offset power circuit 15. A signal output from the adder 62 is supplied to a bi-level digitizing circuit 7.

In the third embodiment constructed as described above, the output voltage of the offset voltage source 151 is higher than that of the offset voltage source 152. The changeover switch 153 selects either one of the offset voltage sources 151 and 152 based on the single pixel clock pulse when the original 5 is being scanned with the light emitted from the light source 3. Accordingly, the third embodiment has a functional structure equivalent to that of such a type that when the offset voltage source 151 is selected, the gain of the gain variable amplifier 6 is increased, whereas when the offset source 152 is selected, the gain of the gain variable amplifier 6 is reduced. Therefore, the operation of the third embodiment is also identical to that of the first embodiment.

In each of the embodiments referred to above, the original is scanned once with each light of different colors, which is emitted from the light sources, and the information on the original is read in line sequence. It is, however, needless to say that the color information reading apparatus of the present invention can be applied even when transmissive filters having different colors are successively inserted between white light source and a CCD, and information about different colors is read under this condition in line sequence or even when information about different colors is read using a white light source and a color CCD in line sequence.

According to the present invention, as has been described above, when either a signal obtained by scanning an original with first light or a signal obtained by scanning the original with second light is converted into a binary level, i.e., represented in binary form, a threshold level at the time of the bi-level digitizing of the signal is substantially changed to another for each pixel. In addition, color discrimination is made in a color discriminating means based on data representative of, in binary form, the signal obtained by scanning the original with the first light and data representative of, in binary form, the signal obtained by scanning the original with the second light. If the output of the color discriminating means differs from the output of the color discriminating means prior to one pixel, then the output thereof is converted into either a white signal or a black signal so as to be output to the next stage. Therefore, wrong color discrimination is not made to the same colors. In addition, two alternative forms of output, i.e., "logic 1" and "logic 0" states are produced for each pixel with respect to a half-tone color section. As a result of its color discrimination by the color discriminating means, the output of the color discriminating means differs in the half-tone color section from the output prior to one pixel. Thus, the output of the color discriminating means is produced from a color processing means as either the white signal or the black signal, so that the half-tone color section is electrically processed as either the white or the black. Therefore, the half-tone color section is no longer electrically-processed as an unspecified color other than the white and the black. Further, the color information reading apparatus of the present invention including a threshold-level shifting means, a color discriminating means and a color processing means can also be simplified in structure.

Having now fully described the invention, it will be apparent to those skilled in the art that many changes and modifications can be made without departing from the spirit or scope of the invention as set forth herein.

What is claimed is:

1. A color information reading apparatus comprising:

original information reading means for scanning an original once with each of first and second light of different colors so as to convert light reflected from the original into electric signals, thereby outputting the converted respective signals in line sequence;

bi-level digitizing means for representing each output from said original information reading means in binary form;

threshold level shifting means for changing a threshold-level-upon-bi-level-digitizing to another for each pixel when either a signal obtained by scanning the original with the first light or a signal obtained by scanning the original with the second light is converted into a binary level;

color discriminating means for discriminating among colors based on data representing in binary form the signal obtained by scanning the original with the first light and data representing in binary form the signal obtained by scanning the original with the second light; and color processing means for converting the output from said color discriminating means into either a white signal or a black signal so as to output the converted signal therefrom when the output of said color discriminating means differs from the output of said color discriminating means prior to one pixel.

2. A color information reading apparatus according to claim 1, wherein said threshold level shifting means is used as means for changing the gain of said original information reading means to another.

3. A color information reading apparatus according to claim 1, wherein said threshold level shifting means is used as means for changing the threshold level of said bi-level digitizing means to another.

4. A color information reading apparatus according to claim 1, wherein said threshold level shifting means is used as means for adding a bias value to the output from said original information reading means.

5. A color information reading apparatus according to claim 1, wherein said color processing means includes logical-product operating means for AND-operating the output from said color discriminating means with the output from said color discriminating means prior to one pixel.

* * * * *